(12) United States Patent
Mock

(10) Patent No.: US 7,939,984 B2
(45) Date of Patent: May 10, 2011

(54) LAMINATION HAVING TAPERED TOOTH GEOMETRY WHICH IS SUITABLE FOR USE IN ELECTRIC MOTOR

(75) Inventor: M. Robert Mock, Midway, UT (US)

(73) Assignee: Woodward HRT, Inc., Santa Clarita, CA (US)

( * ) Notice: Subject to any disclaimer, the term of this patent is extended or adjusted under 35 U.S.C. 154(b) by 185 days.

(21) Appl. No.: 12/236,177

(22) Filed: Sep. 23, 2008

(65) Prior Publication Data

US 2009/0108702 A1   Apr. 30, 2009

Related U.S. Application Data

(60) Provisional application No. 60/983,769, filed on Oct. 30, 2007.

(51) Int. Cl.
*H02K 1/06* (2006.01)
(52) U.S. Cl. .......... 310/216.111; 310/179; 310/216.069; 310/216.074
(58) Field of Classification Search ........... 310/216.111, 310/179, 216.069, 216.074
See application file for complete search history.

(56) References Cited

U.S. PATENT DOCUMENTS

| | | | | |
|---|---|---|---|---|
| 2,227,470 A * | 1/1941 | Weathers | ...................... | 318/692 |
| 2,227,471 A * | 1/1941 | Weathers | ...................... | 318/692 |
| 2,679,605 A * | 5/1954 | Kilgore | ...................... | 310/111 |
| 2,856,547 A * | 10/1958 | Saums | ........................... | 310/45 |
| 3,221,195 A * | 11/1965 | Hoffmann | ...................... | 310/179 |
| 3,294,996 A * | 12/1966 | Rogachev et al. | ............. | 310/179 |
| 3,458,239 A * | 7/1969 | Dorsman | ...................... | 310/90.5 |
| 4,883,999 A * | 11/1989 | Hendershot | ............. | 310/216.071 |
| 5,086,245 A | 2/1992 | Sieja et al. | | |
| 5,719,453 A * | 2/1998 | Horst | ........................... | 310/68 R |
| 5,777,416 A | 7/1998 | Kolomeitsev | | |
| 5,804,896 A | 9/1998 | Takehara et al. | | |
| 5,844,346 A * | 12/1998 | Kolomeitsev et al. | ...... | 310/254.1 |
| 6,025,668 A * | 2/2000 | Kolomeitsev | ................. | 310/187 |
| 6,060,809 A * | 5/2000 | Pengov | ...................... | 310/168 |
| 6,218,758 B1 * | 4/2001 | Miura et al. | ........... | 310/216.071 |
| 6,229,241 B1 * | 5/2001 | Ishigami et al. | ............. | 310/208 |
| 6,278,213 B1 * | 8/2001 | Bradfield | ............... | 310/216.069 |
| 6,291,918 B1 * | 9/2001 | Umeda et al. | ................. | 310/215 |
| 6,441,529 B1 * | 8/2002 | Mimura et al. | ........ | 310/216.074 |

(Continued)

FOREIGN PATENT DOCUMENTS

DE           10051386 A1    4/2001

(Continued)

*Primary Examiner* — Quyen Leung
*Assistant Examiner* — Alex W Mok
(74) *Attorney, Agent, or Firm* — BainwoodHuang

(57) ABSTRACT

An electric motor has a stator, and a rotor disposed within the stator. The stator has a set of stator laminations and a set of windings held in position by the set of stator laminations. The rotor is arranged to rotate about an axis. The set of stator laminations is arranged into a stack. Each stator lamination includes an outer section, and a set of teeth coupled to the outer section. Each tooth of the set of teeth extends from that outer section toward the axis. Each tooth has (i) a first end which is proximate to the outer section and distal to the axis, and (ii) a second end which is proximate to the axis and distal to the outer section. A width of the first end of each tooth is substantially greater than a width of the second end of each tooth.

11 Claims, 5 Drawing Sheets

U.S. PATENT DOCUMENTS

| | | | |
|---|---|---|---|
| 6,559,572 B2 * | 5/2003 | Nakamura | 310/216.071 |
| 6,744,168 B2 * | 6/2004 | Fukuda et al. | 310/215 |
| 6,798,105 B1 * | 9/2004 | Nilson | 310/179 |
| 6,853,106 B2 * | 2/2005 | Fujiwara et al. | 310/184 |
| 6,940,205 B1 * | 9/2005 | Murakami et al. | 310/254.1 |
| 7,109,679 B2 | 9/2006 | Edson et al. | |
| 2005/0023910 A1 * | 2/2005 | Lukenich | 310/71 |
| 2005/0046296 A1 * | 3/2005 | Nakamura | 310/179 |
| 2005/0212374 A1 * | 9/2005 | Mitcham | 310/216 |
| 2006/0138883 A1 * | 6/2006 | Yagai et al. | 310/71 |
| 2007/0126310 A1 | 6/2007 | Tang et al. | |

FOREIGN PATENT DOCUMENTS

| | | |
|---|---|---|
| GB | 2308018 A | 6/1997 |
| WO | 9739512 A1 | 10/1997 |

* cited by examiner

LAMINATION HAVING TAPERED TOOTH GEOMETRY WHICH IS SUITABLE FOR USE IN ELECTRIC MOTOR

CROSS REFERENCE TO RELATED APPLICATIONS

This application claims the benefit of U.S. Provisional Patent Application No. 60/983,769 filed on Oct. 30, 2007, entitled "LAMINATION HAVING TAPERED TOOTH GEOMETRY WHICH IS SUITABLE FOR USE IN ELECTRIC MOTOR", the contents and teachings of which are hereby incorporated by reference in their entirety.

BACKGROUND

A conventional electric motor includes a stator and a rotor which is configured to rotate within the stator. One conventional stator uses a stack of laminations to support a set of windings. The laminations in combination with the windings form a set of electromagnets which is configured to produce a changing magnetic field to turn the rotor.

FIG. 1 shows a cross sectional view of a conventional brushless DC motor 20 having a stator 22 and a rotor 24. The stator 22 includes stator laminations 26 which extend around the rotor 24. The rotor 24 includes a rotor shaft 28 and permanent magnets 30 distributed around the shaft 28.

Each stator lamination 26 includes an outer ring portion 32 and stator teeth 34 which protrude inwardly from the outer ring portion 32 toward the rotor 24. The windings of the stator 22 are omitted from FIG. 1 for simplicity but typically wrap around the stator teeth 34 of the stator laminations 26 to form motor windings. Slots 36 separate the stator teeth 34.

As shown in FIG. 1, the depth (d) of the slots 36 is less than the overall radius (r) of the rotor 24, i.e., d<r. Additionally, the overall diameter $D_{S1}$ of the stator is less than twice the overall diameter $D_{R1}$ of the rotor 24. That is, $2*D_{R1} > D_{S1}$. Furthermore, the general slot cross sectional area is typically greater than that of the stator tooth 34.

Also, for each stator tooth 34, the tooth flanks 38 (i.e., the tooth sides along their mid-sections 42) are parallel and flare away from each other at the tooth end 44 adjacent the rotor 24. In particular, the tooth corners at the end 44 extend into tips forming a shoe 46 which is substantially wider than the mid-section 42 of the tooth 34 when measured perpendicularly from a central axis of the stator tooth 34.

SUMMARY

There may be advantageous tradeoffs obtained by reducing the rotor diameter (e.g., see $D_{R1}$ in FIG. 1) relative to the stator diameter (e.g., see $D_{S1}$ in FIG. 1). In particular, if the overall stator diameter is more than twice the overall rotor diameter (e.g., if $D_{S1} > 2*D_{R1}$), certain dynamic control capabilities may be available such as faster spin-up.

FIG. 2 shows a resulting motor 120 that could result if one were to take the motor 20 of FIG. 1 and follow conventional motor design practices to create a deep slot motor design. As shown in FIG. 2, the motor 120 has a stator 122 and a rotor 124. The stator 122 includes stator laminations 126 which extend around the rotor 124. The rotor 124 includes a rotor shaft 128 and permanent magnets 130.

Each stator lamination 126 includes an outer ring portion 132 and stator teeth 134 which protrude inwardly from the outer ring portion 132 toward the rotor 124. Again, the windings of the stator 122 are omitted from FIG. 2 for simplicity but typically wrap around the stator teeth 134 of the stator laminations 126 to form motor windings. Slots 136 separate the stator teeth 134.

In contrast to the motor 20 of FIG. 1, the overall stator diameter $D_{S2}$ of the stator 122 of the resulting motor 120 is at least 2.5 times the overall rotor diameter $D_{R2}$ of the rotor 124. That is, $D_{S2} > 2.5*D_{R2}$. Additionally, the slots 136 of the resulting motor 120 are proportionately deeper than the slots 36 of the motor 20. Similarly, the stator teeth 134 of the resulting motor 120 are proportionately longer than the stator teeth 34 of the motor 20.

However, in a similar manner to the motor 20 of FIG. 1, the general cross sectional area of the slot 136 is greater than that of the stator tooth 134. Additionally, for each stator tooth 134, the tooth flanks 138 (i.e., the tooth sides along their mid-sections 142) are parallel and flare away from each other at the stator tooth end 144 adjacent the rotor 124. Specifically, the tooth corners at the end 144 extend into tips forming a shoe 146 which is substantially wider than the mid-section 142 of the tooth 134 when measured perpendicularly from a central axis of the stator tooth 134.

Unfortunately, there may be deficiencies to the motor 120. For example, it would be difficult to drive the motor 120 to produce high torque. Rather, the deep slot design of the motor 120 would be prone to lamination steel magnetic saturation resulting from the high magneto-motive force (MMF) from the high current density in the windings. Such saturation would significantly limit the torque capabilities that could otherwise be achieved without this saturation.

In contrast to the above-described conventional motor 20 (see FIG. 1), an improved lamination for a motor has a tapered tooth design. In particular, the width of the teeth narrows closer towards the rotor. Such a design permits higher MMF with less saturation, if any. Accordingly, the improved lamination enables the motor to operate more efficiently.

One embodiment is directed to an electric motor having a stator, and a rotor disposed within the stator. The stator has a set of stator laminations and a set of windings held in position by the set of stator laminations. The rotor is arranged to rotate about a rotor axis. The set of stator laminations is arranged as a stack. Each stator lamination includes an outer section, and a set of teeth coupled to the outer section. Each tooth of the set of teeth extends from that outer section toward the rotor axis. Each tooth has (i) a first end which is proximate to the outer section and distal to the rotor axis, and (ii) a second end which is proximate to the rotor axis and distal to the outer section. A width of the first end of each tooth is substantially greater than a width of the second end of that tooth as measured perpendicularly from a central axis of that tooth.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 3:
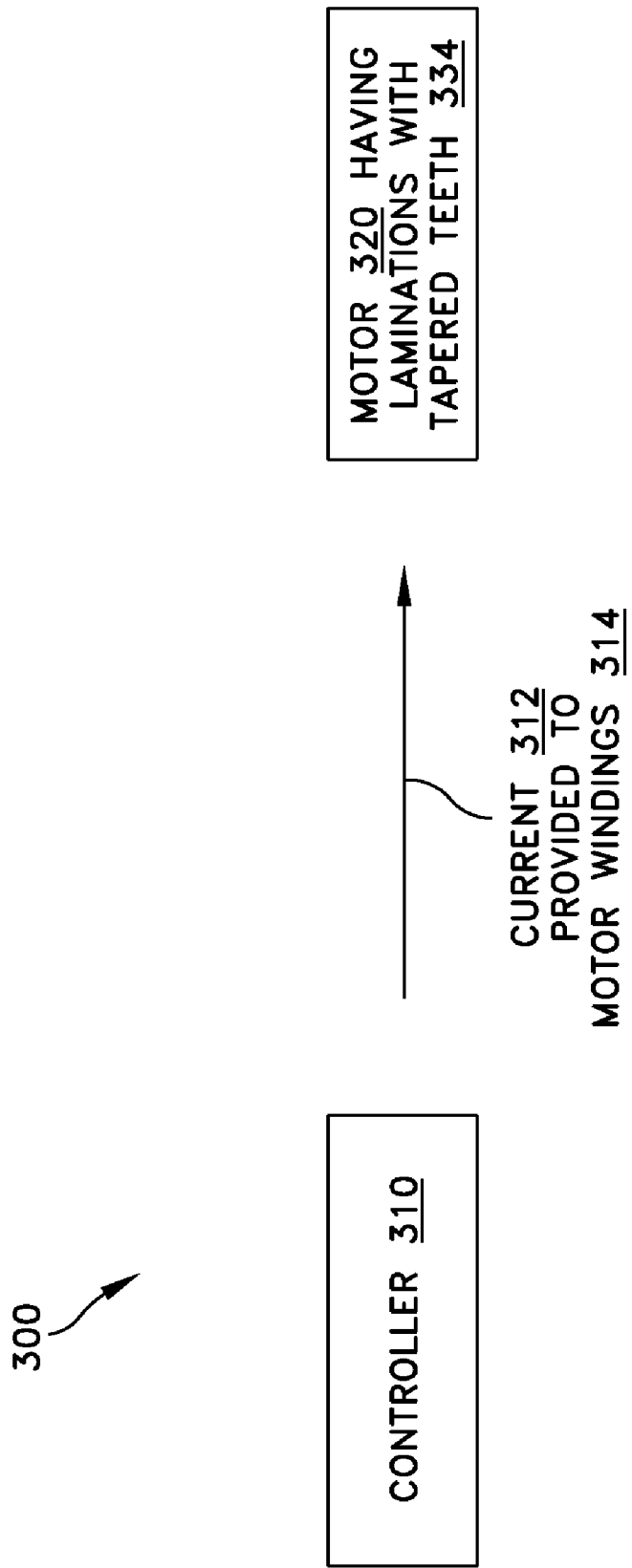
FIG. 3 is a block diagram of an electronic system which includes a deep slot motor having an improved stator lamination with tapered teeth.

FIG. 3 shows an electronic system 300 having an electronic controller 310 and a motor 320. The electronic controller 310 controls operation of the motor 320. In particular, the electronic controller 310 controls electric current 312 through various windings 314 of the motor 320.

Figure 4:
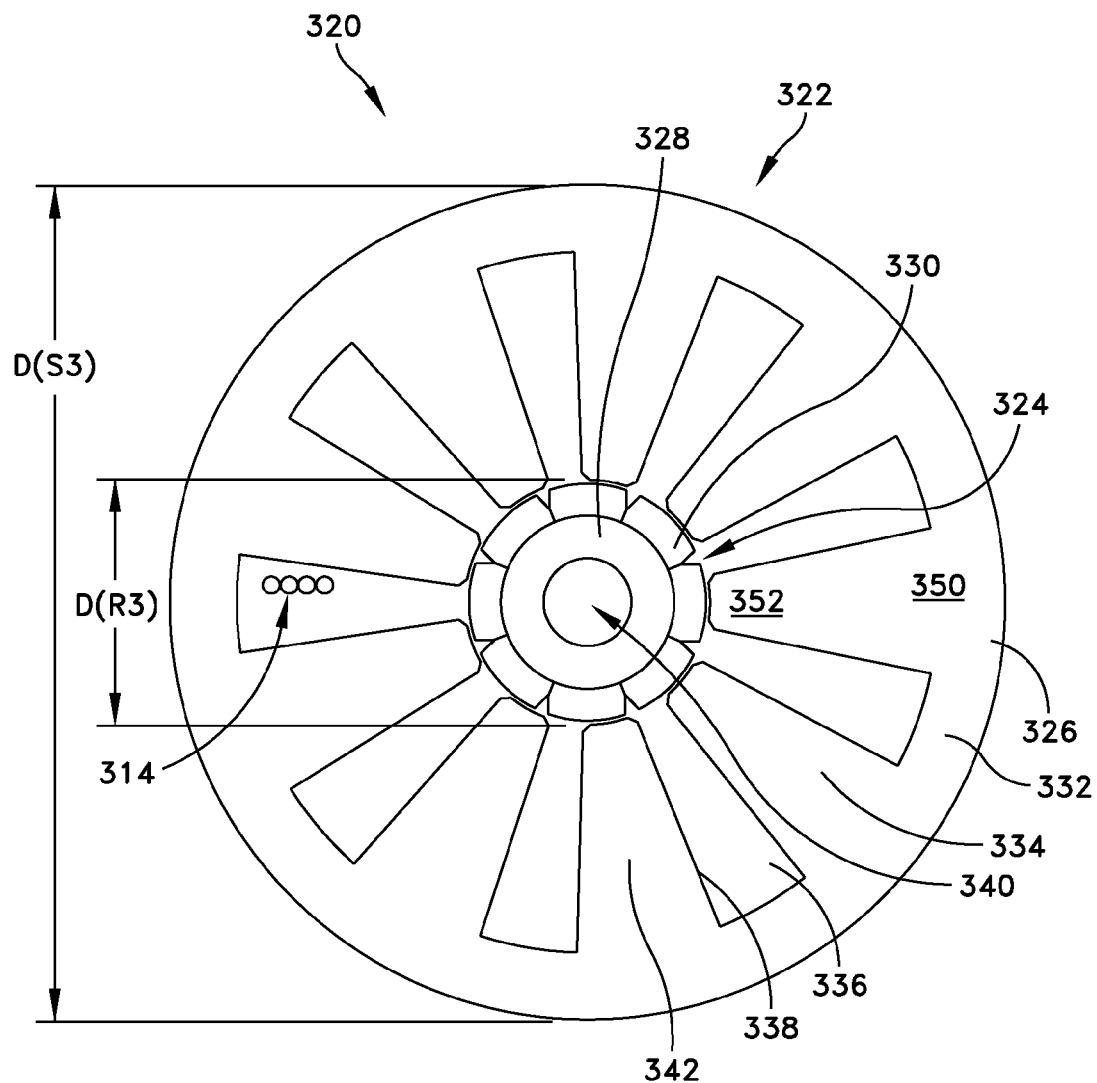
FIG. 4 is a cross sectional view of the deep slot motor of FIG. 3 which includes a profile of a stator lamination.

FIG. 4 shows a cross sectional view of various portions of the motor 320. As shown, the motor 320 includes a stator 322 and a rotor 324. The stator 322 includes stator laminations 326 which extend around the rotor 324. The rotor 324 includes a rotor shaft 328 and permanent magnets 330.

Figure 5:
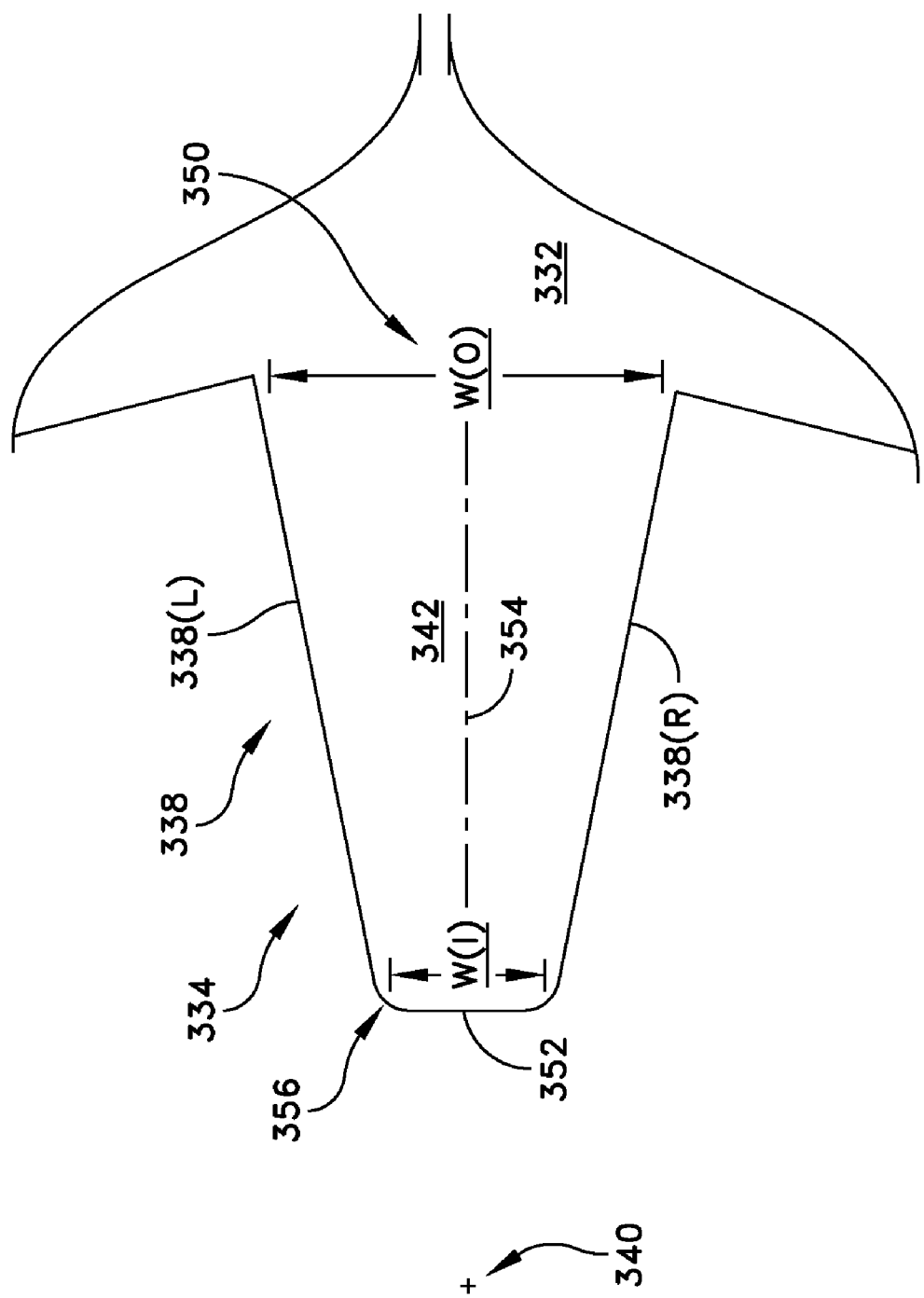
FIG. 5 is a detailed view of a tooth of the stator lamination of FIG. 4.

Each stator lamination 326 includes an outer section 332 and stator teeth 334 which protrude inwardly from the outer section 332 toward the rotor 324. Only a portion of the windings 314 (shown cross-sectionally) is shown FIG. 4 for simplicity but it nevertheless should be understood that the windings 314 wrap around each stator tooth 334 of each stator lamination 326. Slots 336 separate the stator teeth 334. FIG. 5 is a detailed view of one of the teeth 334.

Figure 1:
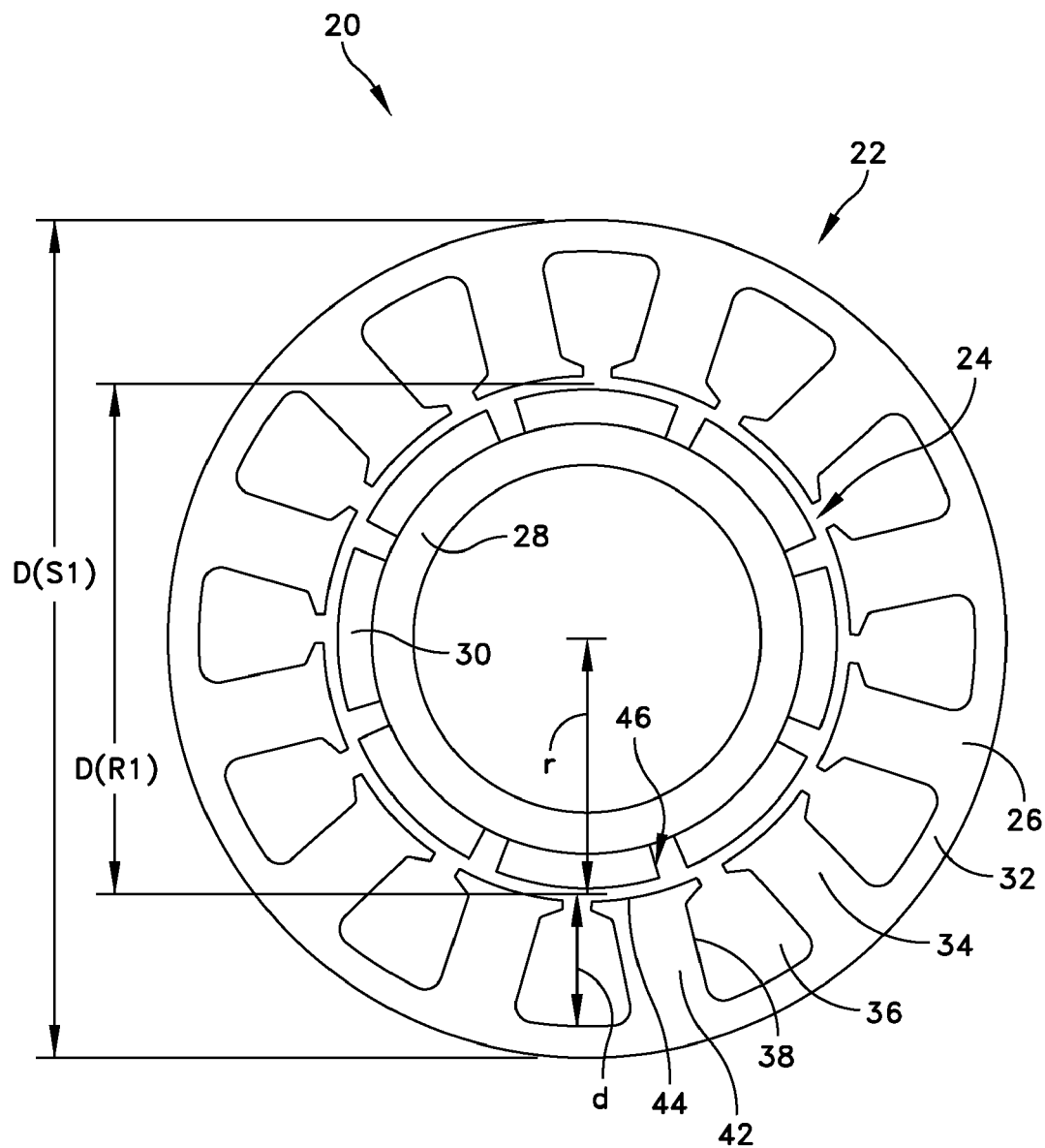
FIG. 1 is a profile of a conventional stator lamination.

As shown in FIG. 4, the overall stator diameter $D_{S3}$ of the stator 322 is at least 2.5 times the overall rotor diameter $D_{R3}$ of the rotor 324. That is, $D_{S3} > 2.5 * D_{R3}$. Additionally, in comparison to the earlier-described conventional motor 20 (see FIG. 1), the slots 336 of the lamination 326 of the motor 320 (FIG. 4) are proportionately deeper than the slots 36 of the motor 20 (FIG. 1). Similarly, the teeth 334 of the motor 320 are proportionately longer than the teeth 34 of the motor 20.

With reference now to FIGS. 4 and 5, described below are some lamination geometry characteristics for the stator lamination 326. Each stator tooth 334 defines a left side 338(L) and a right side 338(R) (collectively sides or flanks 338, see FIG. 5). Both sides 338 of each tooth 334 extend substantially radially toward the center 340. In particular, the tooth sides 338 lead substantially toward a center axis (or simply center) 340 about which the rotor 324 rotates. That is, the sides 338 of the stator teeth 334 along the mid-sections 342 are not parallel but instead extend (or generally point) toward the center 340 of the rotor 324.

Additionally, each stator tooth 334 has (i) a first end 350 which is proximate to the outer section 322 and distal to the center 340, and (ii) a second end 352 which is proximate to the center 340 and distal to the outer section 332. Furthermore, as best shown in FIG. 5, a width ($W_O$) of the first end 350 of each stator tooth 334 (i.e., the end furthest from the center 340) is substantially greater than a width ($W_I$) of the second end 352 of that tooth 334 (i.e., the end closest to the center 340). In particular, each stator tooth 334 narrows from the outer section 332 (FIG. 4) toward the center 340. Accordingly, progressing along a mid-line 354 (FIG. 5) of each stator tooth 334 from the outer section 332 toward the center 340, the width (or cross-section) narrows.

Also, as shown in FIG. 4, the set of stator teeth 334 defines a maximum rotor diameter $D_M$ (i.e., $D_{R3}$ in FIG. 4), and the outer section 332 defines a stator diameter $D_S$ (i.e., $D_{S3}$ in FIG. 4) which is at least twice as large as the maximum rotor diameter $D_M$. In some arrangements, the ratio between the stator diameter $D_S$ and the rotor diameter $D_M$ is within a range of 2.5:1 and 10:1.

Furthermore, the second end 352 of each tooth 334 is shoeless. That is, the second end 352 of each tooth 334 is chamfered or is given a large radius, e.g., see the large radius 356. This feature is illustrated in FIGS. 4 and 5 where the left and right sides 338 of each tooth 334 taper toward each other at the second end 352 in a rounded manner.

Additionally, the set of stator teeth 334 defines a uniform tooth profile and a uniform slot profile. The uniform slot profile is arranged to accommodate windings 314. The uniform tooth profile has a larger area than the uniform slot profile.

Furthermore, the laminations 326 are suitable for use in electric motors having a variety of deep slot motor sizes. Also, the laminations 326 are appropriate in a variety of motor manufacturing methods and methods of operating a motor.

As described above, the laminations 326 overcomes deficiencies in conventional stator laminations and improves maximum torque and motor constant, i.e., (motor torque constant)/square root (motor resistance) and the capabilities of any specific size deep slot motor. For example, such laminations 326 could be utilized in deep slot permanent magnet brushless DC motors of servoactuators or electromagnetic actuators (EMAs) with active damping. One suitable context is on an aircraft (e.g., for nose wheel steering). Some aspects of electromagnetic actuator damping are described in U.S. Pat. No. 7,109,679 entitled "DAMPING FOR ELECTRO-MECHANICAL ACTUATORS", the entire teachings of which are hereby incorporated by reference.

Figure 2:
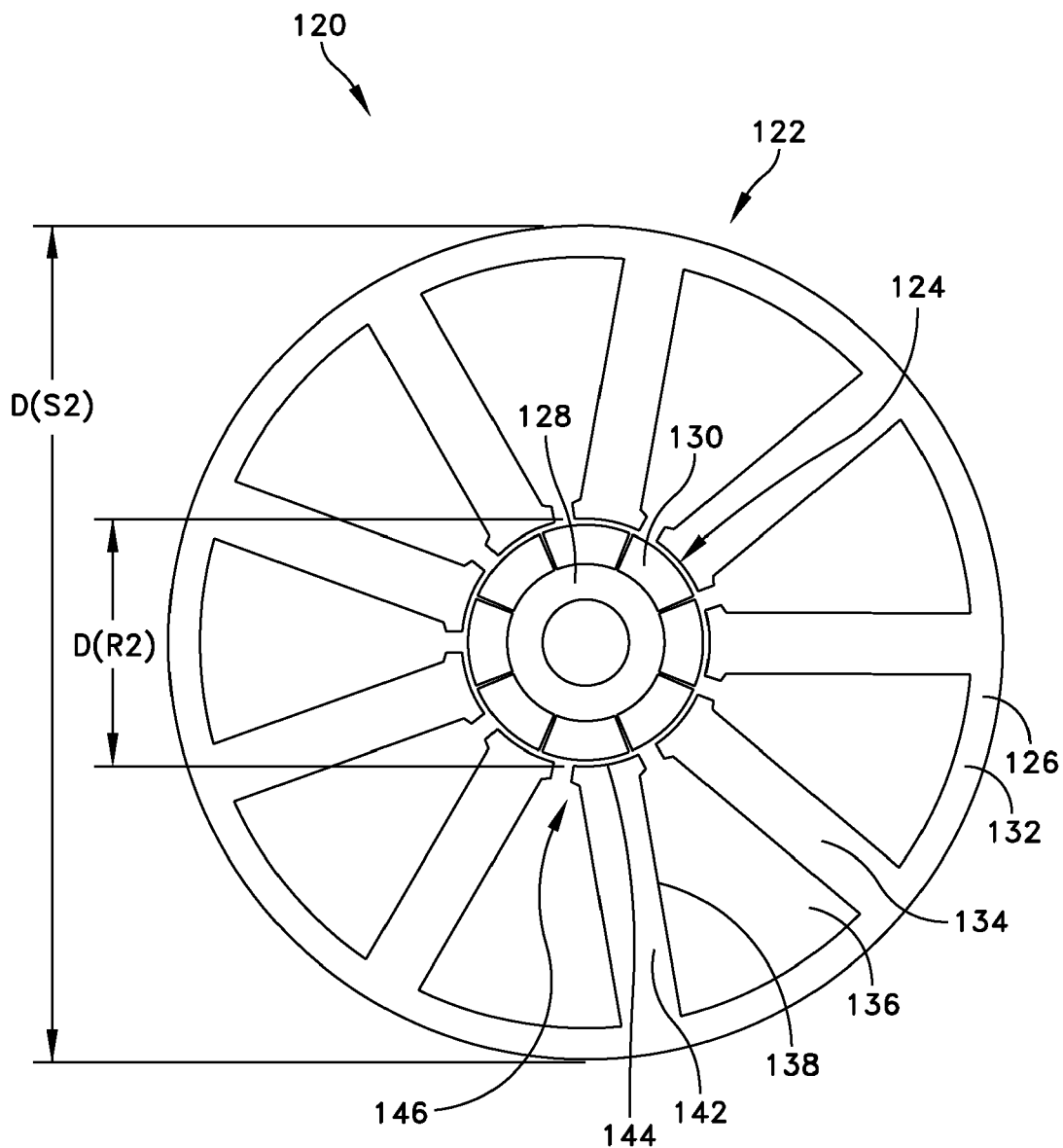
FIG. 2 is a profile of a potential stator lamination for a deep slot motor.

It should be understood that the design of FIG. 2 has a strong tendency to saturate at the base of the tooth because its geometry. In particular, high current and the particular geometry induce saturation.

In contrast to the design in FIG. 2, the motor 320 using laminations 326 having the tapered tooth design using the same level of driving current but with even fewer coils around the each tooth 334, or alternatively less current with the same number of coils around each tooth 334. In this situation, higher MMF is created because there is little or no saturation (e.g., in some situations there may be saturation locally at a tooth tip 352). Accordingly, rather than succumb to saturation which could restrict and reduce magnetic flux in the tooth and the gap between the tooth end and the rotor magnet as in the design of FIG. 2, the motor 320 of FIGS. 3 and 4 is able to operate without such saturation drawbacks.

As described above, an improved lamination 326 for a motor 320 has a tapered tooth design. In particular, the width of the teeth 334 narrows closer towards the rotor 324. Such a design permits higher MMF with less saturation, if any. Correspondingly, the improved lamination enables the motor 320 to operate more efficiently and at higher torques.

While various embodiments of the invention have been particularly shown and described, it will be understood by those skilled in the art that various changes in form and details may be made therein without departing from the spirit and scope of the invention as defined by the appended claims.

For example, it should be understood that the motor 320 was described above as having a rotor 324 at the center 340 and a stator 322 disposed around the rotor 324 by way of example only. In these arrangements, the outer body is stationary and the inner/central body rotates. In other arrangements, the alternative is true. That is, the outer body rotates and the inner/central body is stationary. Such modifications, enhancements and alternatives are intended to belong to various embodiments of the invention.

What is claimed is:

1. A motor, comprising:
    a stator including (i) an outer section which defines a center, and (ii) a set of teeth coupled to the outer section, each tooth of the set of teeth extending from the outer section toward the center defined by the outer section, each tooth having (i) a first end which is proximate to the outer section and distal to the center, and (ii) a second end which is proximate to the center and distal to the outer section, a width of the first end of each tooth being substantially greater than a width of the second end of each tooth;

a rotor arranged to rotate relative to the stator, the rotor including a set of permanent magnets, the number of permanent magnets in the set of permanent magnets being at least two;

the set of teeth defining a maximum rotor diameter; and the outer section defining a stator diameter which is at least twice as large as the maximum rotor diameter, each tooth narrowing from the outer section toward the center, the second end of each tooth being substantially shoeless; and the set of teeth defining a uniform tooth profile and a uniform slot profile, the uniform slot profile being arranged to accommodate windings, and the uniform tooth profile having a larger area than the uniform slot profile;

wherein portions of the windings accommodated in the uniform slot profile are arranged in rows and columns, wherein the number of rows is at least two, and the number of columns is at least two.

2. A motor as in claim 1 wherein each tooth defines a left side and a right side, the left and right sides along a mid-portion of each tooth being oriented substantially radially toward the center.

3. A motor as in claim 1 wherein the second end of each tooth is chamfered, with one of a substantial radius and chamfer, toward the center defined by the outer section of the stator.

4. A motor as in claim 1, wherein the windings, in combination with the set of teeth, are constructed and arranged, upon the induction of current into the windings, to substantially eliminate lamination steel magnetic saturation when the width of the first end of each tooth is substantially greater than the width of the second end of each tooth.

5. A motor as in claim 1, wherein the number of permanent magnets is at least three.

6. A motor as in claim 1, wherein the set of teeth defines a set of slots within which with reside at least a portion of a set of windings, each slot of the set of slots being formed by a side of a first tooth and a side of a second tooth adjacent the first tooth, the side of the first tooth and the side of the second tooth which form that slot being non-parallel.

7. A motor as in claim 6, wherein, for each slot of the set of slots: the side of the first tooth and the side of the second tooth which form that slot and which are non-parallel become nearer each other toward the center defined by the outer section of the stator to provide reduced lamination steel magnetic saturation upon induction of current through the set of windings.

8. A motor as in claim 6, wherein the set of windings includes a first row of windings which wraps around a first tooth, and a second row of windings which wraps around a second tooth which is adjacent the first tooth.

9. An electronic system, comprising:

a motor controller; and a motor in electrical communication with the motor controller, the motor having a stator and a rotor arranged to rotate relative to the stator, the stator including (i) an outer section which defines a center, and (ii) a set of teeth coupled to the outer section, each tooth of the set of teeth extending from the outer section toward the center defined by the outer section, each tooth having (i) a first end which is proximate to the outer section and distal to the center, and (ii) a second end which is proximate to the center and distal to the outer section, a width of the first end of each tooth being substantially greater than a width of the second end of each tooth;

the rotor including a set of permanent magnets, the number of permanent magnets in the set of permanent magnets being at least two;

the set of teeth defining a maximum rotor diameter; and the outer section defining a stator diameter which is at least twice as large as the maximum rotor diameter, each tooth narrowing from the outer section toward the center, the second end of each tooth being substantially shoeless; and the set of teeth defining a uniform tooth profile and a uniform slot profile, the uniform slot profile being arranged to accommodate windings, and the uniform tooth profile having a larger area than the uniform slot profile;

wherein portions of the windings accommodated in the uniform slot profile are arranged in rows and columns, wherein the number of rows is at least two, and the number of columns is at least two.

10. An electronic system as in claim 9 wherein each tooth defines a left side and a right side, the left and right sides along a mid-portion of each tooth being oriented substantially radially toward the center.

11. An electronic system as in claim 9 wherein the second end of each tooth is chamfered, with one of a substantial radius and chamfer, toward the center defined by the outer section of the stator.

* * * * *